US010967871B1

(12) United States Patent
Marti et al.

(10) Patent No.: US 10,967,871 B1
(45) Date of Patent: Apr. 6, 2021

(54) AUTOMATICALLY ESTIMATING SKILL LEVELS AND CONFIDENCE LEVELS OF DRIVERS

(71) Applicant: HARMAN INTERNATIONAL INDUSTRIES, INCORPORATED, Stamford, CT (US)

(72) Inventors: Stefan Marti, Oakland, CA (US); Joseph Verbeke, San Francisco, CA (US); Sven Kratz, Saratoga, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/833,193

(22) Filed: Mar. 27, 2020

(51) Int. Cl.
*B60Q 1/00* (2006.01)
*B60W 40/08* (2012.01)
*B60W 50/12* (2012.01)
*B60W 50/16* (2020.01)
*B60W 50/14* (2020.01)

(52) U.S. Cl.
CPC ............ *B60W 40/08* (2013.01); *B60W 50/12* (2013.01); *B60W 50/16* (2013.01); *B60W 2040/0872* (2013.01); *B60W 2050/143* (2013.01); *B60W 2050/146* (2013.01)

(58) Field of Classification Search
CPC .. B60W 40/08; B60W 60/0051; B60W 50/14; B60W 60/0016; A61B 5/04085; A61B 5/02416; A61B 5/746; A61B 5/747; A61B 5/7282
See application file for complete search history.

(56) References Cited

U.S. PATENT DOCUMENTS 8,170,725 B2 * 5/2012 Chin .................. B62D 6/007
701/1
2020/0317210 A1 * 10/2020 Yang .................. A61B 5/7282

* cited by examiner

*Primary Examiner* — Toan N Pham
(74) *Attorney, Agent, or Firm* — Artegis Law Group, LLP (57) ABSTRACT

In various embodiments, a driver sensing subsystem computes a characterization of a driver based on physiological attribute(s) of the driver that are measured as the driver operates a vehicle. Subsequently, a driver assessment application uses a confidence level model to estimate a confidence level associated with the driver based on the characterization of the driver. The driver assessment application then causes driver assistance application(s) to perform operation(s) that are based on the confidence level and modify at least one functionality of the vehicle. Advantageously, by enabling the driver assistance application(s) to take into account the confidence level of the driver, the driver assessment application can improve driving safety relative to conventional techniques for implementing driver assistance applications that disregard the confidence levels of drivers.

20 Claims, 3 Drawing Sheets

AUTOMATICALLY ESTIMATING SKILL LEVELS AND CONFIDENCE LEVELS OF DRIVERS

BACKGROUND

Field of the Various Embodiments

The various embodiments relate generally to computer science and automotive systems and, more specifically, to automatically estimating skill levels and confidence levels of drivers.

Description of the Related Art

Advanced driver assistance systems ("ADAS") are intended to increase driving safety and improve the overall driving experiences of drivers. A typical ADAS includes one or more outward-facing sensors, one or more vehicle sensors, a vehicle observation subsystem, one or more driver assistance applications, and one or more control mechanisms for the vehicle. The outward-facing sensors, vehicle sensors, and the vehicle observation subsystem normally monitor the environment surrounding the vehicle and the vehicle itself to generate vehicle state data. Each of the driver assistance applications usually implements a different ADAS feature, such as, and with limitation, anti-lock braking, blind spot detection, collision avoidance, lane keeping assist, hill descent control, or autonomous parking. Based on the vehicle state data, a given driver assistance application determines whether to alter the operation of the vehicle to increase driving safety and, if so, what adjustments should be made. Each driver assistance application may perform various actions via one or more of the control mechanisms to alter the operation of the vehicle. For example, a driver assistance application could transmit a brake control signal to an actuator to cause a series of braking operations to be applied automatically to the vehicle in order to decrease the speed of the vehicle.

Some driver assistance applications successfully increase driving safety relative to most, if not all, drivers. For example, if the rotational speed of a wheel were to differ from the speed of the vehicle by more than a predetermined threshold, then an anti-lock brake application could perform brake pedal pulsation operations to avoid wheel lock. Because anti-lock brake applications can alter brake pressures individually and at a much faster rate than any human driver can manage, anti-lock brake applications usually increase driving safety relative to most, if not all, drivers.

On the other hand, some driver assistance applications successfully increase driving safety relative to only certain types of drivers. One notable example is a driver assistance application that is designed to implement semi-autonomous driving maneuvers. This type of driver assistance application usually helps less experienced drivers because the application can cause driving maneuvers to be performed that less experienced drivers either cannot perform themselves or do not have the confidence to perform themselves. Accordingly, this type of application can increase driving safety when implemented with less experienced drivers. However, a driver assistance application that implements semi-autonomous driving maneuvers can distract and/or frustrate more experienced drivers and, as a result, can decrease driving safety when implemented with more experienced drivers. For example, a lane keeping assist application generates visual, audible, and/or vibration warnings to a driver when a vehicle starts to drift out of a lane. If the driver does not respond to the warnings, then the lane keeping application causes vehicle operations to be performed that ensure that the vehicle stays in the lane. For a skilled driver who is driving along a well-known route in a familiar vehicle, the warnings generated by a typical lane-keeping application can be distracting to the driver, and the related automatic driving assistance imposed by the application can be unnecessary and undesired. Further, any attempt by the driver to disable the lane-keeping application while operating the vehicle can cause the driver to lose focus on the primary task of driving.

As the foregoing illustrates, what is needed in the art are more effective techniques for implementing driver assistance applications in vehicles.

SUMMARY

One embodiment sets forth a computer-implemented method for modifying functionality associated with a vehicle via at least one driver assistance application. The method includes computing a first characterization of a driver based on at least one physiological attribute of the driver that has been measured while the driver is operating the vehicle; using a confidence level model to estimate a first confidence level associated with the driver based on the first characterization; and causing one or more operations to be performed that are based on the first confidence level and modify at least one vehicle functionality.

At least one technical advantage of the disclosed techniques relative to the prior art is that the disclosed techniques enable driver assistance applications to take into account both the skill level and confidence level of a driver when determining what steps, if any, need to be taken to increase driving safety. In particular, automatically estimating the confidence level of the driver in real-time or near real-time allows a given driver assistance application to adapt the operation of the vehicle to complement the capabilities of the driver in the current driving situation. As a result, with the disclosed techniques, driving safety can be improved across a wider variety of drivers relative to prior art techniques that disregard the skill levels and confidence levels of drivers. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
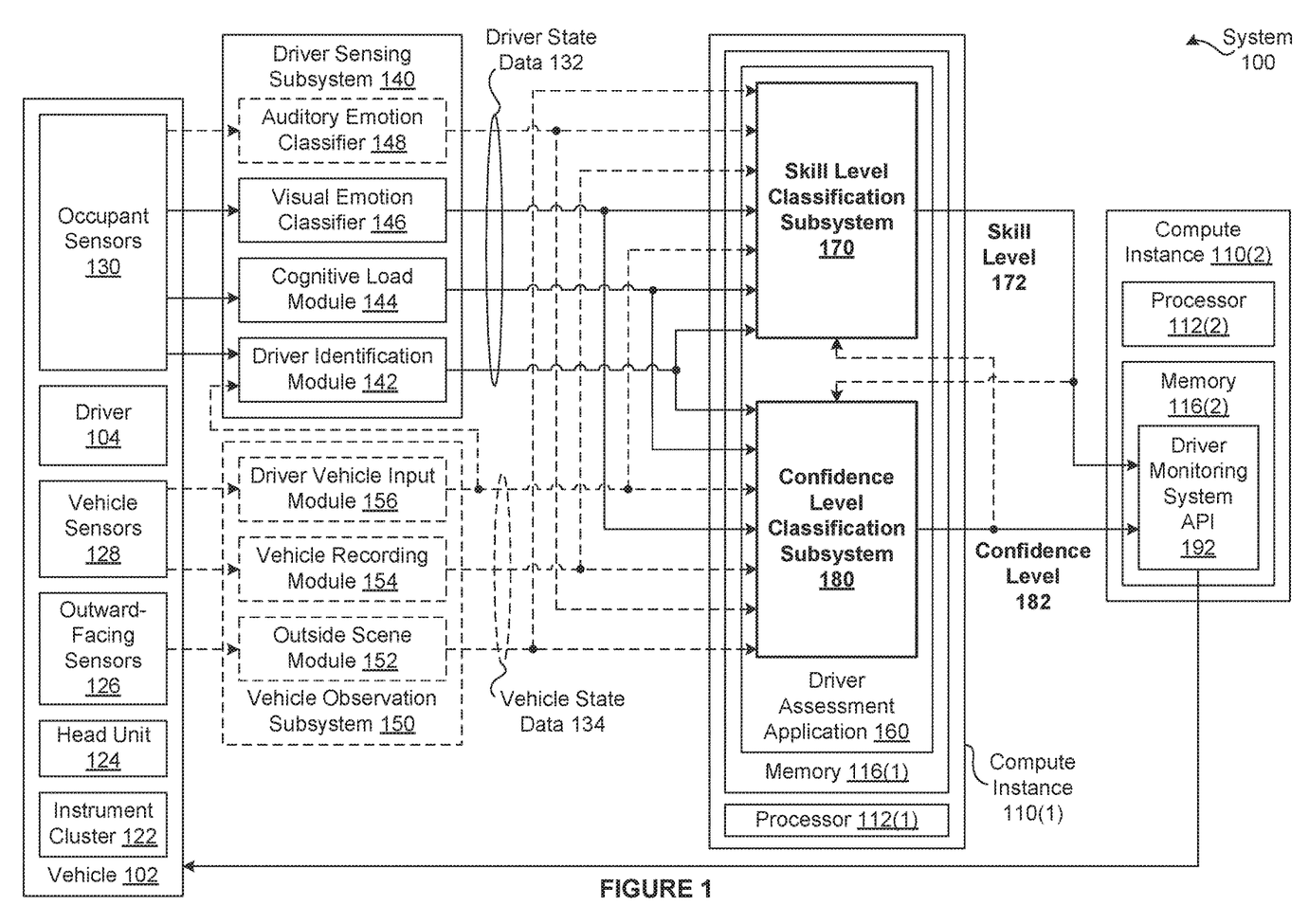
FIG. 1 is a conceptual illustration of a system configured to implement one or more aspects of the various embodiments.

FIG. 1 is a conceptual illustration of a system 100 configured to implement one or more aspects of the various embodiments. The system 100 includes, without limitation, computes instances 110, a vehicle 102, and a driver sensing subsystem 140. In alternate embodiments and as depicted using dashed boxes, the system 100 also includes, without limitation, a vehicle observation subsystem 150. For explanatory purposes, multiple instances of like objects are denoted with reference alphanumeric characters identifying the object and parenthetical alphanumeric characters identifying the instance where needed.

In alternate embodiments, the system 100 may include any number of compute instances 110, any number of vehicles 102, and any number of additional components (e.g., applications, subsystems, modules, etc.) in any combination. Any number of the components of the system 100 may be distributed across multiple geographic locations or implemented in one or more cloud computing environments (i.e., encapsulated shared resources, software, data, etc.) in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each of the compute instances 110 is configured to implement one or more software applications or subsystems of software applications. For explanatory purposes only, each software application is depicted as residing in the memory 116 of a single compute instance 110 and executing on the processor 112 of the single compute instance 110. However, in alternate embodiments, the functionality of each software application may be distributed across any number of other software applications that reside in the memories 116 of any number of compute instances 110 and execute on the processors 112 of any number of compute instances 110 in any combination. Further, the functionality of any number of software applications or subsystems may be consolidated into a single software application or subsystem.

The vehicle 102 may be any type of ground-based or non-ground-based machine that is guided, at least in part, by a human driver 104. For instance, the vehicle 102 may be, among other things, a car, a motorcycle, a sport utility vehicle, a truck, a bus, an all-terrain vehicle, a snowmobile, a commercial construction machine (e.g., a crane, an excavator, etc.), an airplane, a helicopter, or a boat. Furthermore, the vehicle 102 may be a taxi, a ride share vehicle (such as an Uber vehicle, a Lyft vehicle), submarine, electric vertical takeoff and landing vehicle, spaceship, etc.

As shown, the vehicle 102 includes, without limitation, an instrument cluster 122, a head unit 124, any number of outward-facing sensors 126, any number of vehicle sensors 128, the driver 104, and any number of occupant sensors 130. The vehicle 102 may additionally include any number and type of vehicle components that enable the driver 104 to perform the primary driving task as well as any number and type of vehicle components that enable the driver 104 and/or other passengers to perform secondary tasks. Examples of vehicle components that implement the primary driving task include, without limitation, brakes, a powertrain, a transmission, and a steering system. Examples of vehicle components that enable the driver 104 and passengers to perform secondary tasks include, without limitation, a radio, a temperature control system, a navigation system, an in-car internet system, etc.

The instrument cluster 122 and the head unit 124 enable the driver 104 to monitor and/or modify one or more functionalities of the vehicle 102. As referred to herein, the functionalities of the vehicle 102 include, without limitation, operations of the vehicle 102 that are associated with driving the vehicle 102 and any type of actions that are associated with any number of secondary tasks. Examples of functionalities of the vehicle 102 includes, without limitation, the speed of the vehicle 102, the direction of the vehicle 102, information being output on any number of a visual display, an auditory display, and/or a haptic display within the vehicle 102, etc. The functionalities of the vehicle 102 are also referred to herein as "vehicle functionalities." In alternate embodiments, the vehicle 102 may include any number of additional components instead of or in addition to the instrument cluster 122 and the head unit 124 that enable the driver 104 to monitor and/or modify the functionalities of the vehicle 102. For instance, in some embodiments, the vehicle 102 may include a rear-view camera.

The instrument cluster 122 includes, without limitation, any number and type of analog components and any number and type of digital components that aggregate and display data from various components of the vehicle 102. For instance, in some embodiments, the instrument cluster 122 includes, without limitation, an analog speedometer, a digital dashboard, and the compute instance 110 that executes a trip computer application. The digital dashboard may display any amount and type of data related to the vehicle 102, such as a fuel level, an interior temperature, an exterior temperature, and a distance traveled. The trip computer application may record and display any number of statistics related to the vehicle 102. For instance, the trip computer application may record and display an average speed, an average distance traveled, an average fuel consumption, an estimated range, and so forth.

The head unit 124 enables the driver 104 to efficiently perform both the primary driving task and certain secondary tasks. For instance, in some embodiments, the head unit 124 includes, without limitation, a hardware interface to an infotainment system and a navigation system. In some embodiments, the hardware interface includes, without limitation, a touchscreen and any number and combination of input mechanisms, output mechanisms, and control mechanisms (e.g., buttons, sliders, etc.). For instance, and without limitation, the hardware interface may include built-in Bluetooth for hands-free calling and audio streaming, universal serial bus ("USB") connections, speech recognition, rearview camera inputs, video outputs for any number and type of displays, and any number of audio outputs. In general, any number of sensors, displays, receivers, transmitters, etc. may be integrated into the head unit 124 or may be implemented externally to the head unit 124. External devices may communicate with the head unit 124 in any technically feasible fashion.

The outward-facing sensors 126 and the vehicle sensors 128 monitor, respectively, the area surrounding the vehicle 102 and the vehicle 102 itself while the driver 104 operates the vehicle 102. The vehicle observation subsystem 150 processes signals received from the outward-facing sensors 126 and the vehicle sensors 128 to generate vehicle state data 134. As shown, the vehicle observation subsystem 150 includes, without limitation, an outside scene module 152, a vehicle recording module 154, and a driver vehicle input module 156.

The outside scene module 152 processes sensor signals received from any number of the outward-facing sensors 126 (e.g., a forward-facing camera that is mounted on the vehicle 102, a light detection and ranging ("LIDAR") sensor, etc.) to generate environment data (not shown) that is included in the vehicle state data 134. The outside scene module 152 may perform any number and type of operations on the sensor signals in any technically feasible fashion to generate any amount and type of environment data. For instance, in some embodiments, the outside scene module 152 includes, without limitation, a segmentation and classification machine learning model. The outside scene module 152 inputs exterior scene images received via the sensor signals into the segmentation and classification model. In response, the segmentation and classification model segments regions in the exterior scene images, classifies the regions into types (e.g., road, vehicle, road sign, pedestrian, etc.), tracks the movement of the classified regions over time, and outputs tracking data (not shown). As the segmentation and classification model generates the tracking data, the outside scene module 152 adds the tracking data to the environment data.

The vehicle recording module 154 generates vehicle telemetry data (not shown) that is included in the vehicle state data 134. The vehicle telemetry data specifies characteristics of the vehicle 102, such as the speed, lateral acceleration, engine revolutions per minute ("RPM"), battery charge state, and so forth. The driver vehicle input module 156 generates driver input data (not shown) that is included in the vehicle state data 134. The driver input data specifies inputs determined by the driver 104, such as the current steering wheel angle, the accelerator pedal position, the brake pedal position, and so forth.

Each of the outside scene module 152, the vehicle recording module 154, and the driver vehicle input module 156 operates continuously and automatically. As a result, the vehicle observation subsystem 150 updates the vehicle state data 134 in real-time. In alternate embodiments, any number of components included in the vehicle observation subsystem 150 may generate corresponding portions of the vehicle state data 134 based on any type of trigger (e.g., every ten seconds), and each component may be associated with a different trigger.

To increase driving safety and improve the overall driving experiences of drivers 104, the vehicle 102 implements any number of ADAS features via any number of software applications referred to herein as "driver assistance applications" (not shown). As used herein, "increasing driving safety" corresponds to decreasing the likelihood that the vehicle 102 directly or indirectly causes harm to people, animals, and/or objects and/or decreasing the severity of any harm that is caused. Some types of people that can be harmed by the vehicle 102 may include, without limitation, the driver 104, passengers of the vehicle 102, the driver and passengers of other vehicles, pedestrians, cyclists, etc. Some types of objects that can be harmed by the vehicle 102 may include, without limitation, the vehicle 102, other vehicles, light poles, houses, etc. Some examples of ADAS features include, without limitation, anti-lock braking, blind spot detection, collision avoidance, lane keeping assist, hill descent control, autonomous parking, etc.

In some embodiments, any number of driver assistance applications may reside and execute on compute instances 110 included in the head unit 124, the instrument cluster 122, and/or other components of the vehicle 102. In the same or other embodiments, any number of driver assistance applications may reside and execute on compute instances 110 located outside the vehicle 102 and may communicate with components included in the vehicle 102 in any technically feasible fashion. Each driver assistance application may perform any number of actions via any number of control mechanisms associated with the vehicle 102 to alter any number of functionalities of the vehicle 102. For example, a driver assistance application could transmit brake control signals to actuators that control the brakes. In another example, a driver assistance application could alter the data displayed on a touchscreen via an infotainment application programming interface ("API") associated with the head unit 124.

As described previously herein, in one conventional approach to increasing driving safety, conventional driver assistance applications receive the vehicle state data 134. Based on the vehicle state data 134, each conventional driver assistance application determines whether to alter the operation of the vehicle 102 to increase driving safety and, if so, what adjustments should be made. One drawback of such an approach is that some conventional driver assistance applications successfully increase driving safety relative to only certain types of drivers and can actually decrease driving safety when implemented with other types of drivers. For example, a conventional driver assistance application that implements semi-autonomous driving maneuvers can cause driving maneuvers to be performed that less experienced drivers either cannot perform themselves or do not have the confidence to perform themselves. However, a conventional driver assistance application that implements semi-autonomous driving maneuvers can distract and/or frustrate more experienced drivers and, as a result, can decrease driving safety when implemented with more experienced drivers.

Tailoring ADAS Features to Individual Drivers

To enable driver assistance applications to more effectively and reliably increase driving safety, the system 100 includes, without limitation, occupant sensors 130, a driver sensing subsystem 140, a driver assessment application 160, and a driver monitoring system ("DMS") API 192. The occupant sensors 130 may include any number and type of devices that, in real-time, detect and relay physiological data associated with the driver 104 and, optionally, any number of other passengers in the vehicle 102. For instance, the occupant sensors 130 may include, without limitation, any number and combination of infrared cameras, visible light cameras, depth sensors, radio frequency ("RF") radar sensors, LIDAR sensors, electroencephalogram sensors, heart rate sensors, breathing rate sensors, pulse oximeters, galvanic skin response sensors, microphones, and microphone arrays. The occupant sensors 130 may be distributed across various locations. For instance, in some embodiments, each of the occupant sensors 130 is attached to the vehicle 102 (e.g., built into a steering wheel, headrest, etc.) or worn by an occupant of the vehicle 102.

As the driver 104 operates the vehicle, the driver sensing subsystem 140 acquires sensor data from the occupant sensors 130 and processes the sensor data to generate driver state data 132. As shown, the driver sensing subsystem 140 includes, without limitation, a driver identification module 142, a cognitive load module 144, and a visual emotion classifier 146. Although not shown, the driver state data 132 includes, without limitation, an identity classification, a cognitive load classification, and a visual emotion classification for the driver 104.

The driver identification module 142 generates the identity classification based on any amount and type of sensor data received from the occupant sensors 130 in any technically feasible fashion. The identity classification may specify a person, a group of people, or any characteristic that identifies the driver 104 or a group to which the driver 104 belongs (e.g., Uber drivers) in any technically feasible fashion. In some embodiments, the driver identification module 142 includes, without limitation, a machine learning model that is trained to estimate the identity classification. In other embodiments, the driver identification module 142 implements any number and type of heuristics to estimate the identity classification.

In alternate embodiments, the driver identification module 142 determines the identity classification based on the sensor data received from the occupant sensors 130 in conjunction with additional information associated with the driver 104 and/or the vehicle 102. For instance, in some alternate embodiments and as depicted via a dashed arrow, the driver identification module 142 receives driver input data generated by the driver vehicle input module 156. The driver identification module 142 analyzes the driver input data to generate one or more behavioral characterizations for the actions of the driver 104. The driver identification module 142 then determines the identity classification based on the behavior characterization(s) in conjunction with the sensor data received from the occupant sensors 130.

The cognitive load module 144 generates the cognitive load classification for the driver 104 based on any amount and type of sensor data received from the occupant sensors 130. As referred to herein, the cognitive load of the driver 104 at a given point in time correlates to the total amount of mental activity imposed on the driver 104 and is an indication of how hard the driver 104 is concentrating. The cognitive load classification may specify the cognitive load of the driver 104 in any technically feasible fashion and at any level of granularity. For instance, in some embodiments, the cognitive load classification at any given time is one of a low, medium, or high. The cognitive load module 144 may generate the cognitive load classification in any technically feasible fashion.

For instance, in some embodiments, the cognitive load module 144 may determine the cognitive load classification based on sensor data that specifies, without limitation, any number of brain activity, heart rate, skin conductance, steering-wheel grip force, muscle activity, skin/body temperature, and so forth. In the same or other embodiments, the cognitive load module 144 includes, without limitation, a machine learning model that is trained to estimate a pupil-based metric that reflects the cognitive load of the driver 104 based on the sizes and/or levels of reactivity of the pupils of the driver 104. The cognitive load module 144 may measure the sizes and/or levels of reactivity of the pupils in any technically feasible fashion. For instance, in some embodiments, the cognitive load module 144 may measure the sizes and/or levels of reactivity of the pupils directly based on pupil information obtained via IR camera images. In the same or other embodiments, the cognitive load module 144 may measure the sizes and/or levels of reactivity of the pupils indirectly using deep-learning eye movement tracking based on visible light camera images. In some alternate embodiments, the cognitive load module 144 includes, without limitation, a cognitive load classifier (not shown) that generates a value for a cognitive load metric and/or a value for a stress metric based on eye motion data. The eye motion data may include, without limitation, the eye gaze direction, and/or derivatives of eye gaze data patterns in the temporal direction, such as eye saccades and eye fixations, and/or any number and/or types of other derivates of the eye motion data.

In some embodiments, the cognitive load module 144 may determine the cognitive load classification based, at least in part, on audio data received from any number of microphones included in the occupant sensors 130. For instance, the cognitive load module 144 may implement any number of algorithms that analyze the audio data to detect conversational context, conversational turn taking, voice tone and affect, auditory distractions, and the like. For example, and without limitation, the cognitive load module 144 could detect that the driver 104 is engaged in conversation with a passenger, the driver 104 is currently speaking, the tone of the driver 104 indicates that the driver 104 is drowsy, two other passengers are engaged in a second conversation, and so forth.

The visual emotion classifier 146 generates the visual emotion classification based on any amount and type of visual sensor data received from the occupant sensors 130. The visual emotion classification specifies the emotion expressed by the driver 104 via visual cues along any number of emotional dimensions. For instance, in some embodiments, the visual emotion classification includes, without limitation, a discrete emotion classification that specifies emotions such as surprise, joy, fear, sadness, anger, distrust, etc. In the same or other embodiments, the visual emotion classification includes, without limitation, values for a two-dimensional parametrized emotion metric or a three-dimensional parameterized emotion metric. For example, the visual emotion classification could include values for a two-dimensional parametrized emotion metric having the dimensions of valence and arousal or a three-dimensional parameterized emotion having the dimensions of valence, arousal, and dominance. The visual emotion classifier 146 may generate the visual emotion classification in any technically feasible fashion. For instance, in some embodiments, the visual emotion classifier 146 includes, without limitation, a machine learning model that is trained to use any number and/or combination of visible light camera images, infrared light camera images, and/or thermal images of the face of the driver 104 to determine the visual emotion classification.

In alternate embodiments, the driver sensing subsystem 140 may include, without limitation, any number and type of software applications that each generate a different characterization of the driver 104 that is included in the driver state data 132. For instance, in some alternate embodiments, the driver sensing subsystem 140 includes an auditory emotion classifier 148 (depicted with a dashed box). The auditory emotion classifier 148 generates an auditory emotion classification included in the driver state data 132. The auditory emotion classification reflects the emotion expressed by the driver 104 as conveyed by the voice of the driver 104 along any number of emotional dimensions. In some embodiments, the auditory emotion classifier 148 includes, without limitation, a machine learning model that is trained to use the speech of the driver 104 to determine the auditory emotion classification. At any given time, the auditory emotion classification does not necessarily match the visual emotion classification.

Each of the driver identification module 142, the cognitive load module 144, and the visual emotion classifier 146 operates continuously and automatically. As a result, the driver sensing subsystem 140 updates the driver state data 132 in real-time. In alternate embodiments, any number of components included in the driver sensing subsystem 140 may generate corresponding portions of the driver state data 132 based on any type of trigger (e.g., every ten seconds), and each component may be associated with a different trigger.

As shown, the driver assessment application 160 generates a skill level 172 and a confidence level 182 based on the driver state data 132 and any amount (including zero) of additional information. For instance, and as depicted via dashed arrows, the driver assessment application 160 may generate the skill level 172 and the confidence level 182 based on both the driver state data 132 and the vehicle state data 134. In alternate embodiments, the driver assessment application 160 may generate the skill level 172 and the confidence level 182 based on any amount and type of physiological data for the driver 104 in addition to or instead of the driver state data 132. For instance, in alternate embodiments, the driver assessment application 160 may generate the skill level 172 and the confidence level 182 based on the driver state data 132 and any amount of sensor data received directly from one or more of the occupant sensors 130.

The skill level 172 is an estimate of the skill of the driver 104 and the confidence level 182 is an estimate of the confidence of the driver 104. Each of the skill level 172 and the confidence level 182 may be associated with any number of permissible values at any level of granularity. For instance, in some embodiments, the permissible values for the skill level 172 are low, medium, and high. In the same or other embodiments, the permissible values for the confidence level 182 are integers from 1 to 10, where 1 indicates no confidence and 10 indicates complete confidence.

As a general matter, the skill level 172 estimates the overall driving ability of the driver 104 and usually increases gradually over time. For example, when the driver 104 starts learning to drive, the driver 104 would have the lowest possible skill level 172. As the driver 104 gains driving experience, the skill level 172 would gradually increase. By contrast, the confidence level 182 estimates the belief of the driver 104 that the driver 104 is capable of handling the vehicle 102 safely in the current driving environment and can, therefore, change in real-time. For example, if the driver 104 has considerable driving experience, is familiar with the vehicle 102, and the driving conditions are favorable, then the confidence level 182 could be relatively high. In another example, if the vehicle 102 is a rental car, then the confidence level 182 could be relatively low irrespective of the skill level 172. In yet another example, if the driver 104 is driving in adverse driving conditions (e.g., icy roads, heavy snow, road work, etc.), then the confidence level 182 could be relatively low while the adverse driving conditions exist.

As shown, the driver assessment application 160 includes, without limitation, a skill level classification subsystem 170 and a confidence level classification subsystem 180. For explanatory purposes only, the driver assessment application 160 is depicted as residing in the memory 116(1) and executing on the processor 112(1) of the computer instance 110(1). In alternate embodiments, the functionality of the driver assessment application 160 as described herein may be distributed across any number and type of software applications and any number of subsystems that reside and execute on any number of compute instances 110 at any number of physical locations. For instance, in some embodiments, the skill level classification subsystem 170 may reside and execute in the cloud. In the same or other embodiments, the confidence level classification subsystem 180 may reside and execute on a compute instance 110 included in the head unit 124. In alternate embodiments, the driver assessment application 160 generates the confidence level 182 but does not estimate any skill level for the driver 104, and the skill level classification subsystem 170 may be omitted from the system 100.

At the start of each driving session, the driver assessment application 160 sets the skill level 172 and the confidence level 182 to default values. As used herein, a "driving session" refers to a period of time during which the vehicle 102 is continuously running. The driver assessment application 160 may determine the default values in any technically feasible fashion. For instance, in some embodiments, the default values are the lowest permissible values. Subsequently, the skill level classification subsystem 170 and the confidence level classification subsystem 180 generate, respectively, the skill level 172 and the confidence level 182 based the driver state data 132 and any amount and type of additional information.

In alternate embodiments, the inputs to the skill level classification subsystem 170 and the confidence level classification subsystem 180 may differ. For instance, in some alternate embodiments, the skill level classification subsystem 170 has a single input (e.g., the identity classification), and the confidence level classification subsystem 180 has multiple inputs (e.g., the cognitive load classification, the visual emotion classification, and the auditory emotion classification). In some alternate embodiments and as depicted with a dashed arrow, one of the inputs to the skill level classification subsystem 170 is the confidence level 182. In the same or other alternate embodiments and as depicted with another dashed arrow, one of the inputs to the confidence level classification subsystem 180 is the skill level 172.

The skill level classification subsystem 170 may implement any number and type of models that each implement any number and type of algorithms to estimate the skill level 172. For instance, in some embodiments, the skill level classification subsystem 170 includes, without limitation, a cloud-based machine learning model that is trained to compute the skill level 172 of any driver. In other embodiments, the skill level classification subsystem 170 includes, without limitation, one or more machine learning models, where each machine learning model is trained to compute the skill level 172 of a different driver. An example of the skill level classification subsystem 170 that includes, without limitation, a trained machine learning model is described in greater detail in conjunction with FIG. 2.

In yet other embodiments, the skill level classification subsystem 170 may be a model that implements heuristics and/or rules to determine the skill level 172 based on the driver state data 132 and, optionally, the vehicle state data 134 and/or the confidence level 182. For instance, in some embodiments, the skill level classification subsystem 170 may implement a heuristic that detects erratic driving based on the driver input data and a rule that sets the skill level 172 to low when the heuristic detects erratic driving. In the same or other embodiments, the skill level classification subsystem 170 may implement a heuristic that adjusts the skill level 172 to correlate to the confidence level 182 under certain driving conditions. For example, the skill level classification subsystem 170 could reduce the skill level 172 when the confidence level 182 is low and the environment data indicates that traffic is light. By contrast, the skill level classification subsystem 170 could increase the skill level 172 when the confidence level 182 is high and the environment data indicates that the traffic conditions are challenging.

The confidence level classification subsystem 180 may implement any number and type of models that each implement any number and type of algorithms to estimate the confidence level 182. For instance, in some embodiments, the confidence level classification subsystem 180 includes, without limitation, a cloud-based machine learning model that is trained to compute the confidence level 182 of any driver. In other embodiments, the confidence level classification subsystem 180 includes, without limitation, one or more machine learning models, where each machine learning model is trained to compute the confidence level 182 of a different driver. An example of the confidence level classification subsystem 180 that includes, without limitation, a trained machine learning model is described in greater detail in conjunction with FIG. 2.

In yet other embodiments, the confidence level classification subsystem 180 may be a model that implements heuristics and/or rules to determine the confidence level 182 based on the driver state data 132 and, optionally, the vehicle state data 134 and/or the skill level 172. For instance, in some embodiments, the confidence level classification subsystem 180 may implement a heuristic that detects erratic driving based on the driver input data and a rule that sets the confidence level 182 to low when the heuristic detects erratic driving. In the same or other embodiments, the confidence level classification subsystem 180 may implement a heuristic that detects when the driver 104 is feeling overwhelmed based on the cognitive load classification and/or the visual emotion classification. The confidence level classification subsystem 180 may also implement a rule that reduces the confidence level 182 when the driver 104 feels overwhelmed and the driving environment data indicates that traffic is light.

In some embodiments, the driver assessment application 160, the skill level classification subsystem 170, and the confidence level classification subsystem 180 operate continuously and automatically. More precisely, the skill level classification subsystem 170 generates a new skill level 172 whenever at least one of the inputs to the skill level classification subsystem 170 changes. Similarly, the confidence level classification subsystem 180 generates a new confidence level 182 whenever at least one of the inputs to the confidence level classification subsystem 180 changes.

In alternate embodiments, any number of the driver assessment application 160, the skill level classification subsystem 170, and the confidence level classification subsystem 180 may be configured to execute in response to any type of associated trigger instead of executing continuously. For instance, in some alternate embodiments, the skill level classification subsystem 170 executes at the start of each driving session to generate the skill level 172 based on the identity classification but does not re-execute during the remainder of the driving session. In the same or other alternate embodiments, the confidence level classification subsystem 180 generates a new confidence level 182 at regular intervals (e.g., every ten seconds).

As shown, the driver assessment application 160 transmits the skill level 172 and the confidence level 182 to the DMS API 192 to enable any number of driver assistance applications to access the skill level 172 and the confidence level 182. In alternate embodiments, the driver assessment application 160 may enable any number of software applications (including any number of driver assistance applications) to access the skill level 172 and/or the confidence level 182 in any technically feasible fashion.

The DMS API 192 is an interface to a DMS that includes without limitation, the occupant sensors 130, the driver sensing subsystem 140, the driver assessment application 160, and any number of driver assistance applications. As shown, the DMS API 192 resides in the memory 116(2) and executes on the processor 112(2) of the compute instance 110(2). In alternate embodiments, the DMS API 192 may reside and execute on any compute instance 110, such as the compute instance 110(1) or a compute instance 110 included in the head unit 124.

The DMS API 192 may allow any number of driver assistance applications to acquire the skill level 172 and the confidence level 182 in any technically feasible fashion. For instance, in some embodiments, the DMS API 192 provides callbacks from the skill level classification subsystem 170 and the confidence level classification subsystem 180 that can be consumed by any number of driver assistance applications.

In some alternate embodiments, the DMS API 192 may enable the driver 104 to override the skill level 172 and/or the confidence level 182 in any technically feasible fashion (e.g., via a hardware interface in the head unit 124). If at any time, an overriding skill level does not match the skill level 172 generated by the skill level classification subsystem 170 and/or an overriding confidence value does not match the confidence level 182 generated by the confidence level classification subsystem 180, then the DMS API 192 may issue a warning.

Advantageously, the DMS API 192 and/or any number of driver assistance applications may take into account the skill level 172 and/or the confidence level 182 of the driver 104 when determining how to increase driving safety. In particular, each driver assistance application may modify any number of functionalities of the vehicle 102 in real-time to complement the capabilities of the actual driver 104 in the current driving situation. For instance, in some embodiments, the DMS API 192 determines which driver assistance applications to enable based on the skill level 172 and/or the confidence level 182. For example, the DMS API 192 could disable autonomous driving applications when both the skill level 172 and the confidence level 182 are high.

In the same or other embodiments, each driver assistance application may individually adjust any number of functionalities of the vehicle 102 based on the skill level 172 and/or the confidence level 182. For example, a lane keeping application could disable both warnings and corrective actions when the skill level 172 is high, enable warnings and disable corrective actions when the skill level 172 is medium, and enable both warning and corrective actions when the skill level 172 is low. In another example, a digital dashboard application could display a simplified dashboard when the confidence level 182 is low, a regular dashboard when the confidence level 182 is medium, and a dashboard that includes advanced functionality when the confidence level is high. In yet another example, any number of driver assistance applications may dynamically adjust a level of autonomy based on the skill level 172 and the confidence level 182.

In some embodiments, any number of driver assistance applications may enforce any number of restrictions based on the skill level 172 and/or the confidence level 182. For example, a driving restriction application could lock-out the driver 104 when the skill level 172 is relatively low and/or adjust the engine power and handling based on the skill level 172. In the same or other embodiments, any number of driver assistance application may guide the driver 104 based on the skill level 172 and/or the confidence level 182. For example, if the skill level 172 is low, then a tutorial application could transmit (e.g., display, vocalize, etc.) tutorial messages to the driver 104 until the driver 104 has learned how to operate the vehicle 102 to safely perform the primary driving task and, optionally, any number of secondary tasks (e.g., operating an infotainment system). In another example, a troubleshooting application could detect the cause of a relatively low confidence level 182 and suggest a solution to the driver 104.

In alternate embodiments, any number of software applications may assess the performance/progress of the driver 104 based on the skill level 172 and the confidence level 182. For example, if the driver 104 is a student driver, then an assessment application could track the skill level 172 and the confidence level 182 to help an instructor evaluate the progress of the driver 104. In another example, if the driver 104 is a teenager, then a monitoring application could summarize changes in the skill level 172 and/or the confidence level 182 and send alerts to the parents of the driver 104 when predetermined thresholds are not reached.

It will be appreciated that the system shown herein is illustrative and that variations and modifications are possible. The connection topology, including the location and arrangement of the vehicle 102, the compute instances 110, the driver sensing subsystem 140, the vehicle observation subsystem 150, the driver assessment application 160, the skill level classification subsystem 170, the confidence level classification subsystem 180, and the DMS API 192 may be modified as desired. In certain embodiments, one or more components shown in FIG. 1 may not be present. For instance, in some alternate embodiments, any amount of the functionality of the driver sensing subsystem 140 and/or the vehicle observation subsystem 150 may be subsumed into the driver assessment application 160.

Note that the techniques described herein are illustrative rather than restrictive and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

Figure 2:
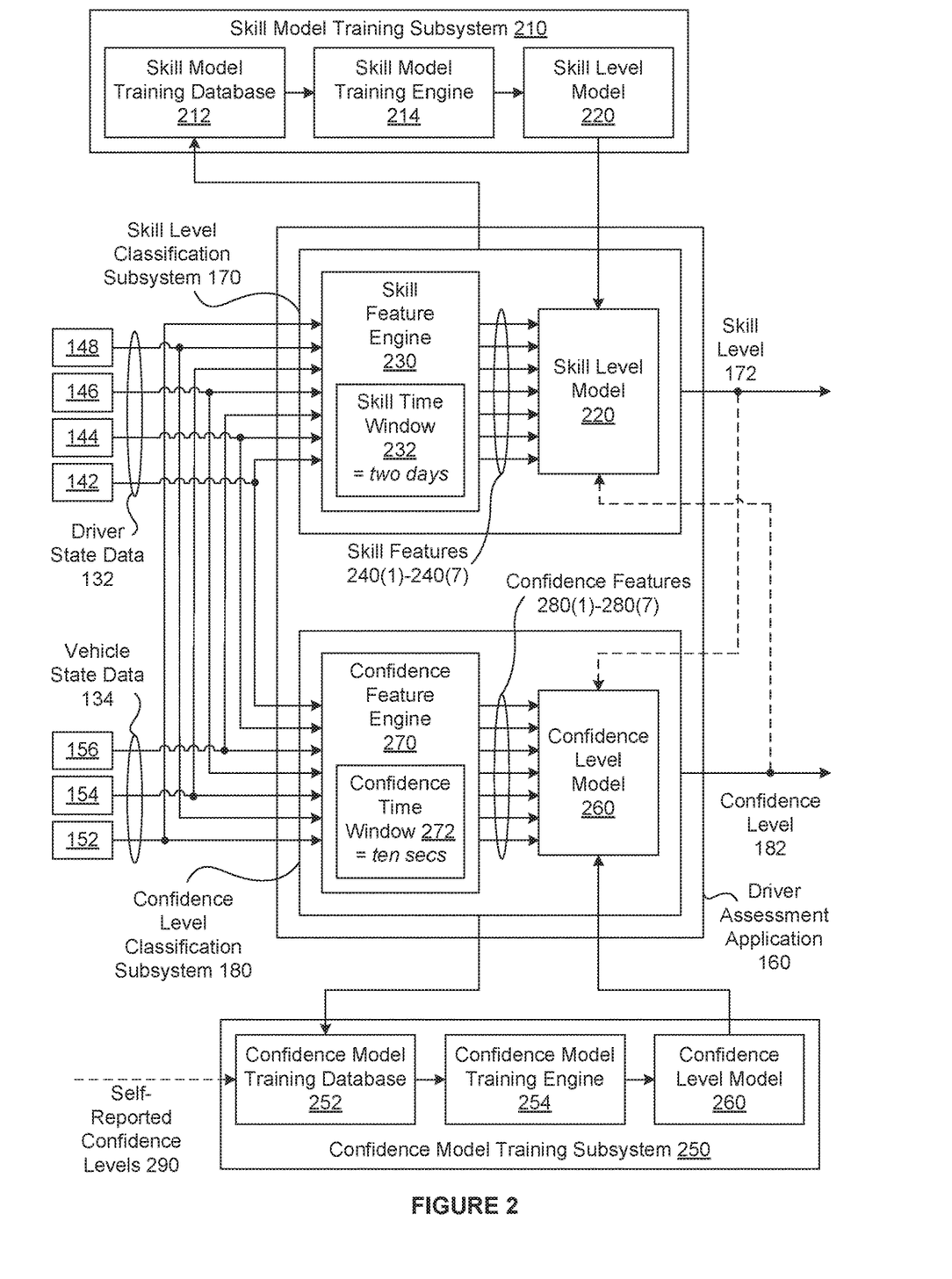
FIG. 2 is a more detailed illustration of the driver assessment application of FIG. 1, according to various embodiments.

Machine Learning Techniques for Estimating Driver Skill Levels and Confidence Levels FIG. 2 is a more detailed illustration of the driver assessment application 160 of FIG. 1, according to various embodiments. As shown, the driver assessment application 160 includes, without limitation, the skill level classification subsystem 170 and the confidence level classification subsystem 180. The driver assessment application 160 may execute the skill level classification subsystem 170 and/or the confidence level classification subsystem 180 during any number of driving sessions in any technically feasible fashion. For instance, in some embodiments, the driver assessment application 160 executes both the skill level classification subsystem 170 and the confidence level classification subsystem 180 at the start of each driving session unless the driver 104 issues disabling command(s).

As shown, the driver assessment application 160 routes the driver state data 132 and the vehicle state data 134 to each of the skill level classification subsystem 170 and the confidence level classification subsystem 180. For explanatory purposes only, the driver state data 132 includes, without limitation, the identity classification, the cognitive load classification, the visual emotion classification, and the auditory emotion classification that are generated by, respectively, the driver identification module 142, the cognitive load module 144, the visual emotion classifier 146, and the auditory emotion classifier 148. The vehicle state data 134 includes, without limitation, the environment data, the vehicle telemetry data, and the driver input data that are generated by, respectively, the outside scene module 152, the vehicle recording module 154, and the driver vehicle input module 156.

In alternate embodiments, the driver assessment application 160 may acquire any amount and type of data associated with the driver 104 (e.g., the driver state data 132) and/or any amount and type of data associated with the vehicle 102 (e.g., the vehicle state data 134) in any technically feasible fashion. In the same or other embodiments, as the driver assessment application 160 receives data associated with the driver 104 and/or the vehicle 102, the driver assessment application 160 routes one subset of the data to the skill level classification subsystem 170 and a different subset of the data to the confidence level classification subsystem 180.

As shown, the skill level classification subsystem 170 includes, without limitation, a skill feature engine 230 and a skill level model 220. The skill feature engine 230 performs moving averaging operations on each of the identity classification, the cognitive load classification, the visual emotion classification, the auditory emotion classification, the environment data, the vehicle telemetry data, and the driver input data to generate, respectively, the skill features 240(1)-240(7). The skill feature engine 230 performs the moving averaging operations over a skill time window 232 that is intended to remove noise and better represent the underlying skill of the driver 104. Because the underlying skill of the driver 104 does not usually vary during a single driving session, the skill time window 232 is typically chosen to span multiple driving sessions. For example, and as depicted in italics, the skill time window 232 could be two days. In alternate embodiments, the skill feature engine 230 may perform any number and type of operations on any amount and type of data received during any number of driving sessions to generate any number of skill features 240.

The skill level classification subsystem 170 inputs the skill features 240 into the skill level model 220. The skill level model 220 is a trained machine learning model that maps the skill features 240 to the skill level 172. After the skill level model 220 generates the skill level 172, the skill level classification subsystem 170 transmits the skill level 172 to the DMS API 192 (not shown in FIG. 2). In alternate embodiments, the skill level classification subsystem 170 and/or the driver assessment application 160 may provide the skill level 172 to any number and type of software applications in any technically feasible fashion.

Also, after the skill level model 220 generates the skill level 172, the skill level classification subsystem 170 transmits new skill training data (not shown) to a skill model training subsystem 210. The skill training data may include, without limitation, any amount and type of data relevant to determining the skill level 172. For instance, in some embodiments, the skill training data includes, without limitation, the driver state data 132, the vehicle state data 134, and the skill features 240. In alternate embodiments, the skill level classification subsystem 170 may transmit new skill training data to the skill model training subsystem 210 based on any type of trigger (e.g., every hour).

As shown, the skill model training subsystem 210 includes, without limitation, a skill model training database 212, a skill model training engine 214, and the skill level model 220. The skill model training database 212 includes, without limitation, any number of skill training sets (not shown). Each skill training set includes, without limitation, the skill features 240 and a ground-truth skill level for a different combination of driver and point in time. Before the driver assessment application 160 initially executes the skill level classification subsystem 170, the skill model training subsystem 210 generates an initial skill model training database 212 based on L buckets (not shown) of initial training data, where L is the total number of possible skill levels 172. Each bucket of initial training data includes, without limitation, the driver state data 132 and the vehicle state data 134 gathered during driving sessions associated with drivers 104 having the associated ground-truth skill level. The skill model training subsystem 210 uses the skill feature engine 230 to generate the initial skill model training database 212 based on the initial training data.

The skill model training subsystem 210 then executes the skill model training engine 214. The skill model training engine 214 implements any number and type of machine learning techniques to train any type of machine learning model based on the skill model training database 212. The skill model training engine 214 outputs the trained machine learning model as the skill level model 220. Subsequently, the skill model training subsystem 210 transmits the skill level model 220 to any number of skill level classification subsystems 170 associated with any number of vehicles 102. In alternate embodiments, any number of skill level classification subsystems 170 may acquire the skill level model 220 in any technically feasible fashion.

As the skill model training subsystem 210 receives new skill training data from the skill level classification subsystem(s) 170, the skill model training subsystem 210 generates new skill training sets and adds the new skill training sets to the skill model training database 212. The skill model training subsystem 210 may generate new skill training sets in any technically feasible fashion. For instance, the skill model training subsystem 210 may determine the ground-truth skill level for a given driver 104 based on the driver state data 132 and/or the vehicle state data 134 acquired over multiple driving sessions associated with the driver 104.

Based on any type of trigger (e.g., every day), the skill model training subsystem 210 re-executes the skill model training engine 214. The skill model training engine 214 retrains the skill level model 220 based on the expanded skill model training database 212 to generate a new skill level model 220. The skill model training subsystem 210 then transmits the new skill level model 220 to any number of skill level classification subsystems 170. In alternate embodiments, any number of skill level classification subsystems 170 may acquire an up-to-date skill level model 220 at any point in time and in any technically feasible fashion.

In alternate embodiments, the skill level model 220 may be trained to map any number and type of skill features 240 to the skill level 172 in any technically feasible fashion. For instance, and as depicted with dashed lines, in alternate embodiments, the confidence level 182 is an additional input to the skill level model 220. The skill model training subsystem 210, the skill feature engine 230, and the skill level classification subsystem 170 described herein are modified accordingly.

As shown, the confidence level classification subsystem 180 includes, without limitation, a confidence feature engine 270 and a confidence level model 260. The confidence feature engine 270 performs moving averaging operations on each of the identity classification, the cognitive load classification, the visual emotion classification, the auditory emotion classification, the environment data, the vehicle telemetry data, and the driver input data to generate, respectively, the confidence features 280(1)-280(7). The confidence feature engine 270 performs the moving averaging operations over a confidence time window 272 that is intended to remove noise and better represent the underlying confidence of the driver 104. Because the underlying confidence of the driver 104 may vary many times during a single driving session, the confidence time window 272 is chosen to facilitate real-time adjustments to the functionalities of the vehicle 102. For example, and as depicted in italics, the confidence time window 272 could be ten seconds. In alternate embodiments, the confidence feature engine 270 may perform any number and type of operations on any amount and type of data received during any number of driving sessions to generate any number of confidence features 280.

The confidence level classification subsystem 180 inputs the confidence features 280 into the confidence level model 260. The confidence level model 260 is a trained machine learning model that maps the confidence features 280 to the confidence level 182. After the confidence level model 260 generates the confidence level 182, the confidence level classification subsystem 180 transmits the confidence level 182 to the DMS API 192 (not shown in FIG. 2). In alternate embodiments, the confidence level classification subsystem 180 and/or the driver assessment application 160 may provide the confidence level 182 to any number and type of software applications in any technically feasible fashion.

After the confidence level model 260 generates the confidence level 182, the confidence level classification subsystem 180 also transmits new confidence training data (not shown) to a confidence model training subsystem 250. The confidence training data may include, without limitation, any amount and type of data relevant to determining the confidence level 182. For instance, in some embodiments, the confidence training data includes, without limitation, the driver state data 132, the vehicle state data 134, and the confidence features 280. In alternate embodiments, the confidence level classification subsystem 180 may transmit new confidence training data to the confidence model training subsystem 250 based on any type of trigger (e.g., every hour).

As shown, the confidence model training subsystem 250 includes, without limitation, a confidence model training database 252, a confidence model training engine 254, and the confidence level model 260. The confidence model training database 252 includes, without limitation, any number of confidence training sets. Each confidence training set includes, without limitation, the confidence features 280 and a self-reported confidence level 290 for a different combination of driving session and point in time. Each self-reported confidence level 290 is assigned by the associated driver 104 and may be gathered in any technically feasible fashion. In alternate embodiments, the self-reported confidence levels 290 may be replaced with ground-truth confidence levels that may be determined in any technically feasible fashion, and the confidence model training subsystem 250 is modified accordingly.

Before the driver assessment application 160 initially executes the confidence level classification subsystem 180, the confidence model training subsystem 250 generates an initial confidence model training database 252 based on C buckets (not shown) of initial training data (not shown), where C is the total number of possible confidence levels 182. Each bucket of initial training data includes, without limitation, the driver state data 132 and the vehicle state data 134 gathered at points in driving sessions when the self-reported confidence level 290 matches the confidence level 182 associated with the bucket. The confidence model training subsystem 250 uses the confidence feature engine 270 to generate the confidence model training database 252 based on the initial training data.

The confidence model training subsystem 250 then executes the confidence model training engine 254. The confidence model training engine 254 implements any number and type of machine learning techniques to train any type of machine learning model based on the confidence model training database 252. The confidence model training engine 254 outputs the trained machine learning model as the confidence level model 260. The confidence model training subsystem 250 then transmits the confidence level model 260 to any number of confidence level classification subsystems 180 associated with any number of vehicles 102. In alternate embodiments, any number of confidence level classification subsystems 180 may acquire the confidence level model 260 in any technically feasible fashion. The confidence model training engine 254 is also referred to herein as "the training application 254."

Subsequently, the confidence model training subsystem 250 receives new confidence training data from any number of confidence level classification subsystems 180. Because the ground-truth confidence level may vary many times during a single driving session, the confidence model training subsystem 250 also acquires new self-reported confidence levels 290 that correspond to at least a portion of the new confidence training data. For each new self-reported confidence level 290, the confidence model training subsystem 250 generates a new confidence training set based on the self-reported confidence level 290, the corresponding driver state data 132, and the corresponding vehicle state data 134. The confidence model training subsystem 250 then adds the new confidence training sets to the confidence model training database 252.

Based on any type of trigger (e.g., every two weeks), the confidence model training subsystem 250 re-executes the confidence model training engine 254. The confidence model training engine 254 retrains the confidence level model 260 based on the expanded confidence model training database 252 to generate an updated confidence level model 260. The confidence model training subsystem 250 then transmits the updated confidence level model 260 to any number of confidence level classification subsystems 180. In alternate embodiments, any number of confidence level classification subsystems 180 may acquire an up-to-date confidence level model 260 at any time and in any technically feasible fashion.

In alternate embodiments, the confidence level model 260 may be trained to map any number and type of confidence features 280 to the confidence level 182 in any technically feasible fashion. For instance, and as depicted with a dashed arrow, in some alternate embodiments, the skill level 172 is an additional input to the confidence level model 260. The confidence model training subsystem 250, the confidence feature engine 270, and the confidence level classification subsystem 180 described herein are modified accordingly.

In some alternate embodiments, the skill level classification subsystem 170 may perform any number (including zero) of pre-processing operations on any amount of the driver state data 132 and, optionally, any amount of the vehicle state data 134 and/or the confidence level 182 to generate a skill input set. The skill level classification subsystem 170 may then apply any type of model to the skill input set to generate the skill level 172. In the same or other alternate embodiments, the confidence level classification subsystem 180 may perform any number (including zero) of pre-processing operations on any amount of the driver state data 132 and, optionally, any amount of the vehicle state data 134 and/or the skill level 172 to generate a confidence input set. The confidence level classification subsystem 180 may then apply any type of model to the confidence input set to generate the confidence level 182.

Figure 3:
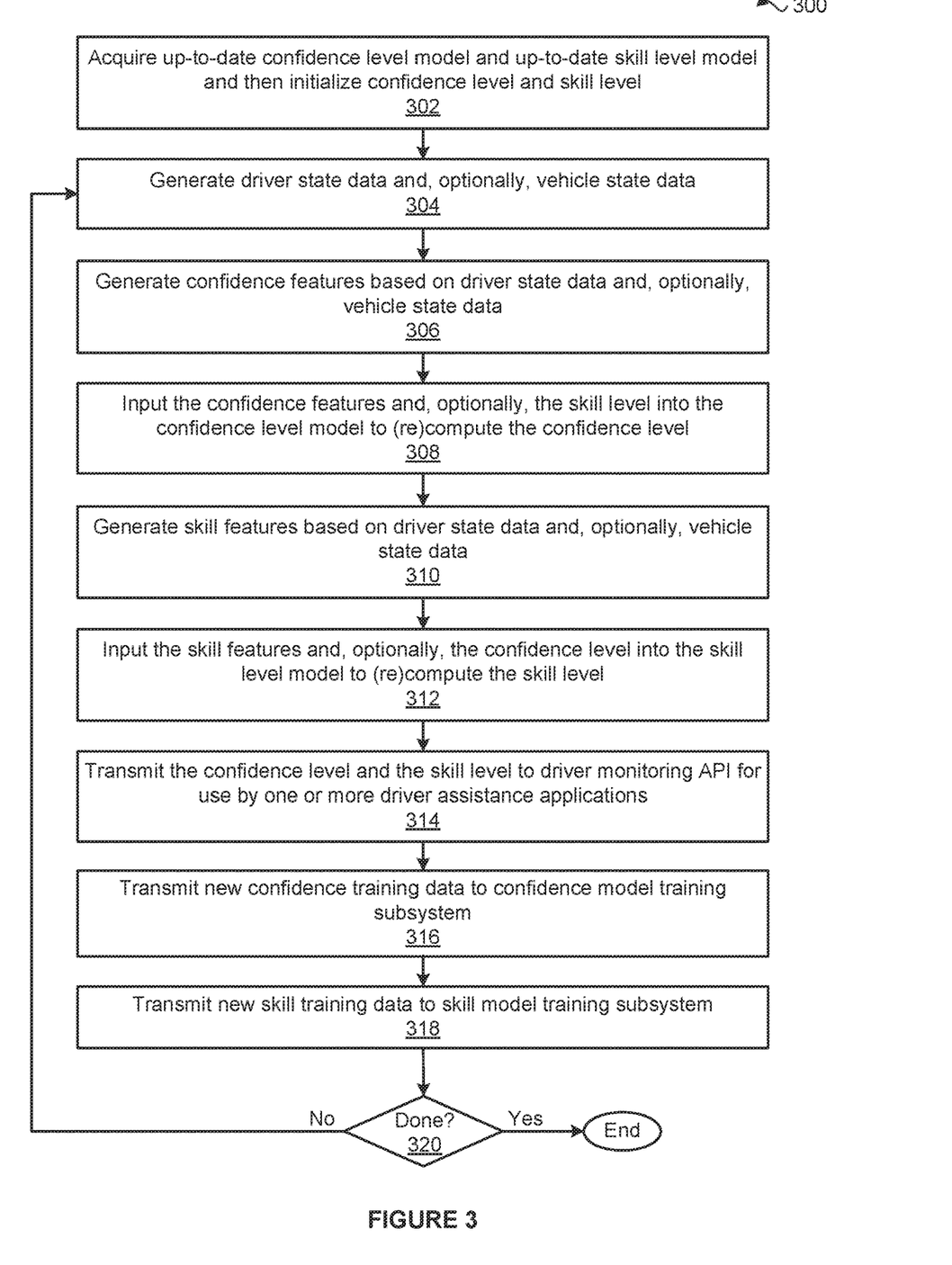
FIG. 3 is a flow diagram of method steps for augmenting one or more driver assistance applications with driver skill level and driver confidence level assessments, according to various embodiments.

FIG. 3 is a flow diagram of method steps for augmenting one or more driver assistance applications with driver skill level and driver confidence level assessments, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the driver assessment application 160 acquires the up-to-date confidence level model 260 and the up-to-date skill level model 220 and then initializes the confidence level 182 and the skill level 172. At step 304, the driver sensing subsystem 140 generates the driver state data 132 and, optionally, the vehicle observation subsystem 150 generates the vehicle state data 134.

At step 306, the confidence feature engine 270 generates the confidence features 280 based on the driver state data 132 and, optionally, the vehicle state data 134. The confidence feature engine 270 may generate the confidence features 280 in any technically feasible fashion. For instance, in some embodiments, the confidence feature engine 270 may perform any number and/or types of time-averaging operations based on any number of portion(s) of the driver state data 132 and, optionally, the vehicle state data 134 over the confidence time window 272 to determine the confidence features. For example, the confidence feature engine 270 could compute the moving average of each component of the driver state data 132 and, optionally, the vehicle state data 134 over the confidence time window 272 to determine the confidence features 280. At step 308, the confidence level classification subsystem 180 inputs the confidence features 280 and, optionally, the skill level 172 into the confidence level model 260 to (re)compute the confidence level 182.

At step 310, the skill feature engine 230 generates the skill features 240 based on the driver state data 132 and, optionally, the vehicle state data 134. The skill feature engine 230 may generate the skill features 240 in any technically feasible fashion. For instance, in some embodiments, the skill feature engine 230 may perform any number and/or types of time-averaging operations based on any number of portion(s) of the driver state data 132 and, optionally, the vehicle state data 134 over the over the skill time window 232 to determine the skill features 240. For example, the skill feature engine 230 could compute the moving average of each component of the driver state data 132 and, optionally, the vehicle state data 134 over the skill time window 232 to determine the skill features 240. At step 312, the skill level classification subsystem 170 inputs the skill features 240 and, optionally, the confidence level 182 into the skill level model 220 to (re)compute the skill level 172.

At step 314, the driver assessment application 160 transmits the confidence level 182 and the skill level 172 to the DMS API 192 for use by one or more driver assistance applications to tailor ADAS features of the vehicle 102 to the driver 104. In alternate embodiments, the driver assessment application 160 may cause any number of driver assistance applications to alter any number of vehicle functionalities based on the confidence level 182 and/or the skill level 172 in any technically feasible fashion.

At step 316, the confidence level classification subsystem 180 transmits new confidence training data to the confidence model training subsystem 250 for us in retraining the confidence level model 260. At step 318, the skill level classification subsystem 170 transmits new skill training data to the skill model training subsystem 210 for use in retraining the skill level model 220.

At step 320, the driver assessment application 160 determines whether the driver assessment application 160 is done. The driver assessment application 160 may determine whether the driver assessment application 160 is done in any technically feasible fashion. For instance, in some embodiments, the driver assessment application 160 determines that the driver assessment application 160 is done based on a signal that is transmitted to the driver assessment application 160 when the driver 104 has finished operating the vehicle 102. If, at step 320, the driver assessment application 160 determines that the driver assessment application 160 is done, then the method 300 terminates.

If, however, at step 320, the driver assessment application 160 determines that the driver assessment application 160 is not done, then the method 300 returns to step 304, where the driver sensing subsystem 140 generates new driver state data 132 and, optionally, the vehicle observation subsystem 150 generates new vehicle state data 134. The method 300 continues to cycle through steps 304-320 until the driver assessment application 160 determines that the driver assessment application 160 is done.

In sum, the disclosed techniques may be used to increase the effectiveness of driver assistance applications. In one embodiment, a driver assessment application includes, without limitation, a confidence level classification subsystem and a skill level classification subsystem. Initially, the driver assessment application sets a skill level and a confidence level to indicate that a driver of an associated vehicle is unknown. During each driving session, occupant sensors monitor various physiological signals associated with the driver of the vehicle. Based on the physiological signals, a driver identification module, a cognitive load module, and a visual emotion classifier generate, respectively, an identity classification, a cognitive load classification, and a visual emotion classification for the driver.

A confidence feature engine included in the confidence level classification subsystem continually time averages each of the identity classification, the cogitative load classification, and the visual emotion classification over a relatively short confidence time window (e.g., ten seconds) to generate corresponding confidence features. The confidence level classification subsystem inputs the confidence features and the skill level into a confidence level model that, in response, recomputes the confidence level. Concurrently, a skill feature engine included in the skill level classification subsystem continually time averages each of the identity classification, the cogitative load classification, and the visual emotion classification over a relatively long skill time window (e.g., two days) to generate corresponding skill features. The skill level classification subsystem inputs the skill features and the confidence level into a skill level model that, in response, recomputes the skill level. The driver assessment application relays the confidence level and the skill level to a DMS API. The driving monitor system API enables any number of driver assistance applications to access the up-to-date confidence level and the up-to-date skill level, thereby enabling the driver assistance applications to tailor ADAS features of the vehicle to the driver in real-time.

At least one technical advantage of the disclosed techniques relative to the prior art is that the driver assessment application enables driver assistance applications to take into account the confidence level and, optionally, the skill level of a driver when determining what steps, if any, need to be taken to increase driving safety. In particular, because the confidence level classification subsystem automatically estimates the confidence level of the driver in real-time or near real-time, a given driver assistance application can adapt any number of functionalities of the vehicle to complement the capabilities of the driver in the current driving situation. As a result, with the disclosed techniques, driving safety as well as the ability of the driver to successfully perform secondary tasks can be improved across a wider variety of drivers relative to prior art techniques that disregard the skill levels and confidence levels of drivers. These technical advantages provide one or more technological advancements over prior art approaches.

1. In some embodiments, a computer-implemented method for modifying functionality associated with a vehicle via at least one driver assistance application comprises computing a first characterization of a driver based on at least one physiological attribute of the driver that has been measured while the driver is operating the vehicle, using a confidence level model to estimate a first confidence level associated with the driver based on the first characterization, and causing one or more operations to be performed that are based on the first confidence level and modify at least one vehicle functionality.

2. The computer-implemented method of clause 1, wherein causing the one or more operations to be performed comprises using a first skill level model to estimate a first skill level associated with the driver based on the first characterization, and transmitting the first confidence level and the first skill level to the at least one driver assistance application, wherein the at least one driver assistance application performs the one or more operations.

3. The computer-implemented method of clauses 1 or 2, wherein using the confidence level model to estimate the first confidence level comprises computing a plurality of features based on the first characterization of the driver and at least one of environment data, vehicle telemetry data, or driver input data, and inputting the plurality of features into the confidence level model to generate the first confidence level.

4. The computer-implemented method of any of clauses 1-3, wherein the one or more operations that are performed automatically alter at least one of a speed of the vehicle, a direction of the vehicle, or information being output on at least one of a visual display, an auditory display, or a haptic display within the vehicle.

5. The computer-implemented method of any of clauses 1-4, where the one or more operations that are performed are associated with at least one of anti-lock braking, blind spot detection, collision avoidance, lane keeping assist, hill descent control, or autonomous parking.

6. The computer-implemented method of any of clauses 1-5, wherein using the confidence level model to estimate the first confidence level comprises determining a set of input data based on the first characterization of the driver and a skill level associated with the driver, and executing the confidence level model on the set of input data to generate the first confidence level.

7. The computer-implemented method of any of clauses 1-6, wherein the first characterization of the driver comprises an identity classification, a cognitive load classification, or an emotion classification.

8. The computer-implemented method of any of clauses 1-7, wherein the confidence level model comprises at least one of a trained machine learning model, a plurality of heuristics, or a plurality of rules.

9. The computer-implemented method of any of clauses 1-8, wherein the at least one physiological attribute is associated with data received via an electroencephalogram sensor, a heart rate sensor, a breathing rate sensor, a pulse oximeter, a galvanic skin response sensor, a camera, or a microphone.

10. The computer-implemented method of any of clauses 1-9, wherein the vehicle comprises a car, a motorcycle, a bus, a commercial construction machine, an airplane, a boat, a submarine, an electric vertical takeoff and landing vehicle, or a spaceship.

11. In some embodiments, one or more non-transitory computer readable media include instructions that, when executed by one or more processors, cause the one or more processors to modify functionality associated with a vehicle via at least one driver assistance application by performing the steps of while a driver is operating the vehicle, computing a first characterization of the driver based on at least one physiological attribute of the driver, using a confidence level model to estimate a first confidence level associated with the driver based on the first characterization, and causing one or more operations to be performed that are based on the first confidence level and modify at least one vehicle functionality.

12. The one or more non-transitory computer readable media of clause 11, wherein causing the at least one driver assistance application to perform the one or more operations comprises using a first skill level model to estimate a first skill level associated with the driver based on the first characterization, and transmitting the first confidence level and the first skill level to the at least one driver assistance application, wherein the at least one driver assistance application performs the one or more operations.

13. The one or more non-transitory computer readable media of clauses 11 or 12, wherein using the confidence level model to estimate the first confidence level comprises computing a plurality of features based on the first characterization of the driver and at least one of environment data, vehicle telemetry data, or driver input data, and inputting the plurality of features into the confidence level model to generate the first confidence level.

14. The one or more non-transitory computer readable media of any of clauses 11-13, wherein using the confidence level model to estimate the first confidence level comprises performing one or more time-averaging operations on the first characterization of the driver to generate a first input, and executing the confidence level model on the first input to generate the first confidence level.

15. The one or more non-transitory computer readable media of any of clauses 11-14, wherein the one or more operations that are performed automatically alter at least one of a speed of the vehicle, a direction of the vehicle, or information being output on at least one of a visual display, an auditory display, or a haptic display within the vehicle.

16. The one or more non-transitory computer readable media of any of clauses 11-15, where the one or more operations that are performed are associated with at least one of anti-lock braking, blind spot detection, collision avoidance, lane keeping assist, hill descent control, or autonomous parking.

17. The one or more non-transitory computer readable media of any of clauses 11-16, wherein the confidence level model comprises a trained machine learning model, and further comprising causing a training application to retrain the confidence level model based on the first characterization of the driver to generate an updated confidence level model.

18. The one or more non-transitory computer readable media of any of clauses 11-17, wherein using the confidence level model to estimate the first confidence level comprises determining a set of input data based on the first characterization of the driver and a skill level associated with the driver, and executing the confidence level model on the set of input data to generate the first confidence level.

19. The one or more non-transitory computer readable media of any of clauses 11-18, wherein the at least one physiological attribute comprises at least one of a level of brain activity, a heart rate, a size of a pupil, or a steering-wheel grip force.

20. In some embodiments, a system comprises one or more memories storing instructions and one or more processors coupled to the one or more memories that, when executing the instructions, perform the steps of computing a first characterization of a driver based on at least one physiological attribute of the driver that has been measured while the driver is operating a vehicle, using a confidence level model to estimate a first confidence level associated with the driver based on the first characterization, and causing one or more driver assistance applications to perform one or more operations that are based on the first confidence level and modify at least one vehicle functionality.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for modifying functionality associated with a vehicle via at least one driver assistance application, the method comprising:
computing a first characterization of a driver based on at least one physiological attribute of the driver that has been measured while the driver is operating the vehicle;
using a confidence level model to estimate a first confidence level associated with the driver based on the first characterization; and
causing one or more operations to be performed that are based on the first confidence level and modify at least one vehicle functionality.

2. The computer-implemented method of claim 1, wherein causing the one or more operations to be performed comprises:
using a first skill level model to estimate a first skill level associated with the driver based on the first characterization; and
transmitting the first confidence level and the first skill level to the at least one driver assistance application, wherein the at least one driver assistance application performs the one or more operations.

3. The computer-implemented method of claim 1, wherein using the confidence level model to estimate the first confidence level comprises:
computing a plurality of features based on the first characterization of the driver and at least one of environment data, vehicle telemetry data, or driver input data; and
inputting the plurality of features into the confidence level model to generate the first confidence level.

4. The computer-implemented method of claim 1, wherein the one or more operations that are performed automatically alter at least one of a speed of the vehicle, a direction of the vehicle, or information being output on at least one of a visual display, an auditory display, or a haptic display within the vehicle.

5. The computer-implemented method of claim 1, where the one or more operations that are performed are associated with at least one of anti-lock braking, blind spot detection, collision avoidance, lane keeping assist, hill descent control, or autonomous parking.

6. The computer-implemented method of claim 1, wherein using the confidence level model to estimate the first confidence level comprises:
determining a set of input data based on the first characterization of the driver and a skill level associated with the driver; and
executing the confidence level model on the set of input data to generate the first confidence level.

7. The computer-implemented method of claim 1, wherein the first characterization of the driver comprises an identity classification, a cognitive load classification, or an emotion classification.

8. The computer-implemented method of claim 1, wherein the confidence level model comprises at least one of a trained machine learning model, a plurality of heuristics, or a plurality of rules.

9. The computer-implemented method of claim 1, wherein the at least one physiological attribute is associated with data received via an electroencephalogram sensor, a heart rate sensor, a breathing rate sensor, a pulse oximeter, a galvanic skin response sensor, a camera, or a microphone.

10. The computer-implemented method of claim 1, wherein the vehicle comprises a car, a motorcycle, a bus, a commercial construction machine, an airplane, a boat, a submarine, an electric vertical takeoff and landing vehicle, or a spaceship.

11. One or more non-transitory computer readable media including instructions that, when executed by one or more processors, cause the one or more processors to modify functionality associated with a vehicle via at least one driver assistance application by performing the steps of:
    while a driver is operating the vehicle, computing a first characterization of the driver based on at least one physiological attribute of the driver;
    using a confidence level model to estimate a first confidence level associated with the driver based on the first characterization; and
    causing one or more operations to be performed that are based on the first confidence level and modify at least one vehicle functionality.

12. The one or more non-transitory computer readable media of claim 11, wherein causing the at least one driver assistance application to perform the one or more operations comprises:
    using a first skill level model to estimate a first skill level associated with the driver based on the first characterization; and
    transmitting the first confidence level and the first skill level to the at least one driver assistance application, wherein the at least one driver assistance application performs the one or more operations.

13. The one or more non-transitory computer readable media of claim 11, wherein using the confidence level model to estimate the first confidence level comprises:
    computing a plurality of features based on the first characterization of the driver and at least one of environment data, vehicle telemetry data, or driver input data; and
    inputting the plurality of features into the confidence level model to generate the first confidence level.

14. The one or more non-transitory computer readable media of claim 11, wherein using the confidence level model to estimate the first confidence level comprises:
    performing one or more time-averaging operations on the first characterization of the driver to generate a first input; and
    executing the confidence level model on the first input to generate the first confidence level.

15. The one or more non-transitory computer readable media of claim 11, wherein the one or more operations that are performed automatically alter at least one of a speed of the vehicle, a direction of the vehicle, or information being output on at least one of a visual display, an auditory display, or a haptic display within the vehicle.

16. The one or more non-transitory computer readable media of claim 11, where the one or more operations that are performed are associated with at least one of anti-lock braking, blind spot detection, collision avoidance, lane keeping assist, hill descent control, or autonomous parking.

17. The one or more non-transitory computer readable media of claim 11, wherein the confidence level model comprises a trained machine learning model, and further comprising causing a training application to retrain the confidence level model based on the first characterization of the driver to generate an updated confidence level model.

18. The one or more non-transitory computer readable media of claim 11, wherein using the confidence level model to estimate the first confidence level comprises:
    determining a set of input data based on the first characterization of the driver and a skill level associated with the driver; and
    executing the confidence level model on the set of input data to generate the first confidence level.

19. The one or more non-transitory computer readable media of claim 11, wherein the at least one physiological attribute comprises at least one of a level of brain activity, a heart rate, a size of a pupil, or a steering-wheel grip force.

20. A system, comprising:
    one or more memories storing instructions; and
    one or more processors coupled to the one or more memories that, when executing the instructions, perform the steps of:
        computing a first characterization of a driver based on at least one physiological attribute of the driver that has been measured while the driver is operating a vehicle,
        using a confidence level model to estimate a first confidence level associated with the driver based on the first characterization, and
        causing one or more driver assistance applications to perform one or more operations that are based on the first confidence level and modify at least one vehicle functionality.

* * * * *